US008788464B1

(12) United States Patent
Lola et al.

(10) Patent No.: US 8,788,464 B1
(45) Date of Patent: Jul. 22, 2014

(54) FAST INGEST, ARCHIVE AND RETRIEVAL SYSTEMS, METHOD AND COMPUTER PROGRAMS

(75) Inventors: Geminiano A. Lola, Newark, CA (US); Christopher M. Allocco, San Jose, CA (US); Becky S. Chu, Pleasanton, CA (US); Nerissa K. Oberlander, San Jose, CA (US); Robert S. Rudisill, San Jose, CA (US); Benjamin R. Tran, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 82 days.

(21) Appl. No.: 11/188,942

(22) Filed: Jul. 25, 2005

(51) Int. Cl.
*G06F 17/30* (2006.01)

(52) U.S. Cl.
USPC ............ 707/667; 707/812; 707/707; 707/661

(58) Field of Classification Search
USPC ......................................................... 707/667
See application file for complete search history.

(56) References Cited

U.S. PATENT DOCUMENTS

| 3,872,448 | A  | * | 3/1975  | Mitchell, Jr. ...................... 705/3 |
| 2003/0126136 | A1 | * | 7/2003  | Omoigui ........................ 707/10 |
| 2004/0268238 | A1 | * | 12/2004 | Liu et al. ........................ 715/513 |
| 2005/0102325 | A1 | * | 5/2005  | Gould et al. ............... 707/104.1 |

\* cited by examiner

*Primary Examiner* — Ajay Bhatia
*Assistant Examiner* — Miranda Huang
(74) *Attorney, Agent, or Firm* — Oblon, Spivak, McClelland, Maier & Neustadt, L.L.P.

(57) ABSTRACT

Systems, processing methods and computer programs that rapidly ingest, archive and dynamically query the data to retrieve it from short and long term storage devices are disclosed. Data is partitioned on queryable fields and metadata relating to the partitioned data is stored in a database. This allows for data to be stored in a persistent queryable state, providing query transparency irrespective of the location that the data is actually stored. Software code with differing functionality that shares consistent data structures and methods is used in components of the system to provide flexibility and speed.

20 Claims, 6 Drawing Sheets

FAST INGEST, ARCHIVE AND RETRIEVAL SYSTEMS, METHOD AND COMPUTER PROGRAMS

BACKGROUND

The present invention relates to systems, methods, and computer programs that ingest, archive and retrieve data.

There are fundamental issues surrounding storing and retrieving very large amounts of data on the scale of terabytes and petabytes. Ingesting large amounts of data rapidly to a queryable state is problematic. Organizing the data for retrieval, as done by conventional databases, can create significant performance overhead, thereby limiting ingest rates.

Databases also have traditionally had limits on the amount of data they can store as well as difficulties maintaining efficient searches of very large data collections or retrieving large amounts of data rapidly. Typically, aged data is removed from databases and archived to a separate system such as an off-line tape library. Accessing the archived data can be slow.

In the case of tape archives, the correct tapes must be located, mounted, and read to on-line storage. Some of the recovered data may not be in a compatible format with the current database and it may not be possible to merge the two data sources together for unified queries. In very large systems a significant amount of data may not be readily available for portions of the data lifecycle.

It would be desirable to have the ability to easily develop by code generation, software code that would ingest, query, and retrieve data from storage systems. Heretofore, it was necessary to create code templates that were replicated, and then hand-edited to obtain parameter differences. This is tedious and time consuming.

It would be desirable to have systems, methods, and computer programs that are able to ingest, correlate, archive, query, and retrieve very large amounts of complex data very quickly.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
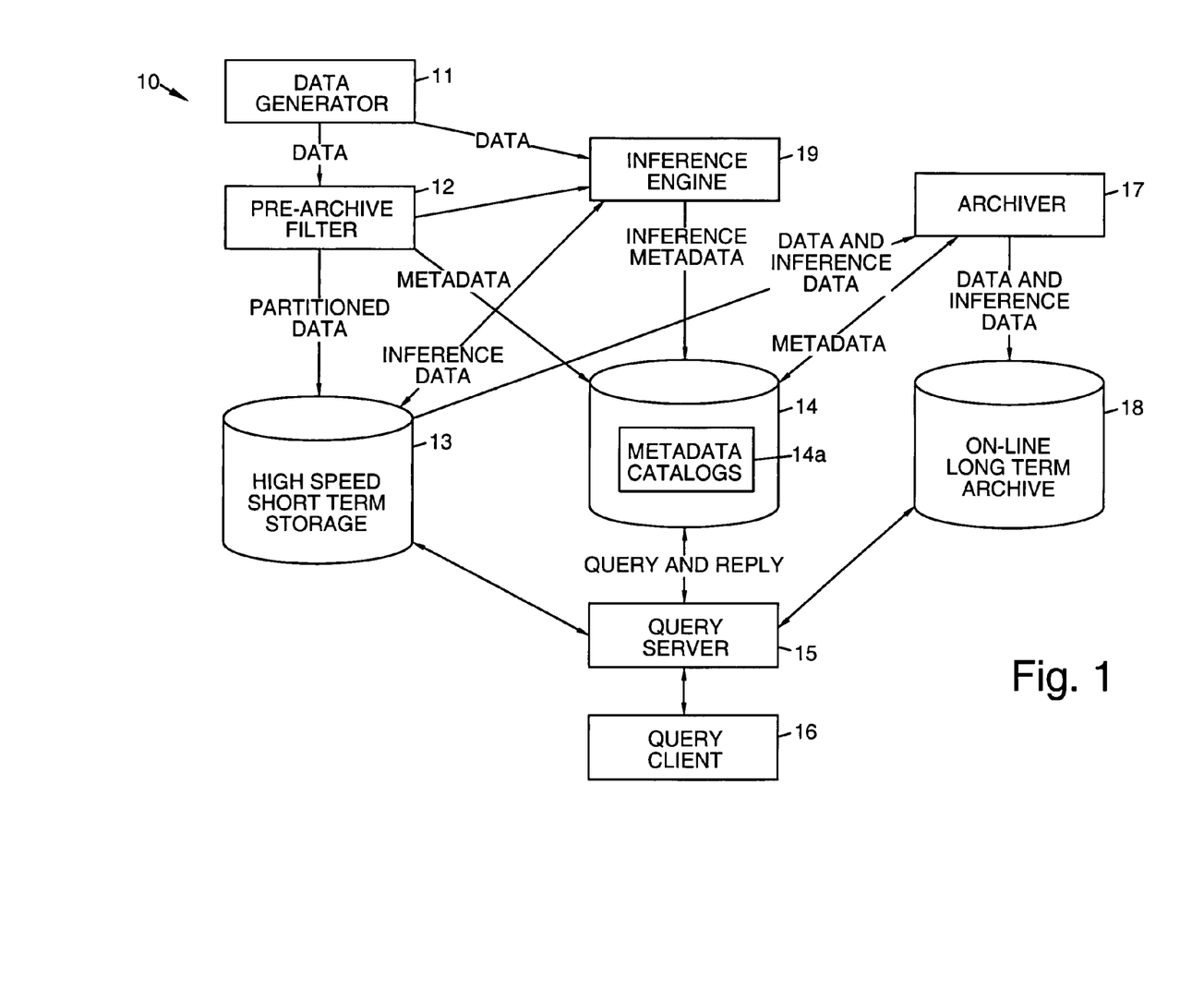
FIG. 1 illustrates an exemplary ingest, archival and retrieval system.

Referring to the drawing figures, FIG. 1 illustrates apparatus 10 comprising an exemplary ingest, archival and retrieval system 10. The exemplary ingest, archival and retrieval system 10 comprises a data generator 11 that generates data that is ingested and stored in the system 10. The data generator 11 is coupled to a pre-archive filter 12. Data generated by the data generator 11 is input to the pre-archive filter 12.

The pre-archive filter 12 is operative to partition the data based upon certain key queryable fields. The pre-archive filter 12 is coupled to one or more high speed short term storage devices 13. The partitioned data is stored in the one or more high speed short term storage devices 13 as flat-files. The pre-archive filter 12 is also coupled to a database 14, where metadata catalog entries are created for each file stored in the short term storage devices 13 and are input to and stored in one or more metadata catalogs 14a in the database 14.

The data generator 11 is also coupled to an inference engine 19. The inference engine 19 is coupled to the one or more high speed short term storage devices 13. The inference engine 19 is operative to read data generated by the data generator 11 and derive inference data that is stored in the one or more high speed short term storage devices 13 along with the partitioned data relating thereto. The inference engine 19 is also coupled to the database 14. The inference engine 19 is operative to generate inference metadata that is stored as metadata catalog entries in the metadata catalog 14a stored in the database 14.

The one or more high speed short term storage devices 13 and the database 14 are coupled to a query server 15. The query server 15 may be accessed by a query client 16 coupled to the query server 15. Since the flat-files are partitioned on queryable fields and because there are catalog entries for each file in the database 14, the flat-files stored in the one or more high speed short term storage devices 13 are queryable by the query client 16 by way of the query server 15.

The one or more high speed short term storage devices 13 are coupled to an archiver 17. The archiver 17 is coupled to an on-line long term content-addressable archive 18 and to the database 14. The on-line long term content-addressable archive 18 is coupled to the query server 15 to allow access to archived data by the query client 16.

The archiver 17 is operative to process data and inference data stored in the one or more high speed short term storage devices 13 and store it in the on-line long term content-addressable archive 18. The archiver 17 is also operative to update the metadata catalog 14a stored in the database 14 when data is archived so that the metadata catalog 14a references the archived data instead of the files stored in the one or more high speed short term storage devices 13.

Figure 2:
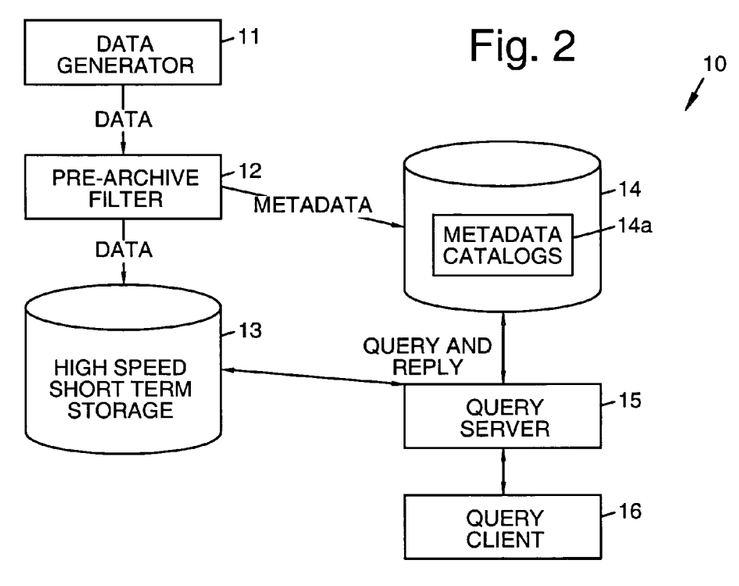
FIG. 2 illustrates the exemplary system configured to ingest data into a queryable state.

FIG. 2 illustrates components of the exemplary ingest, archival and retrieval system 10 that are used to ingest data into a queryable state. In this configuration, the data generator 11, pre-archive filter 12, one or more high speed short term storage devices 13, database 14, query server 15 and query client 16 are involved in the data processing. When new data enters the system 10, it is sorted and partitioned by the pre-archive filter 12, and stored in the short term storage devices 13. At this point, the data becomes available for query. After this, the data remains queryable throughout the entire process of inference engine processing and archiving.

Figure 3:
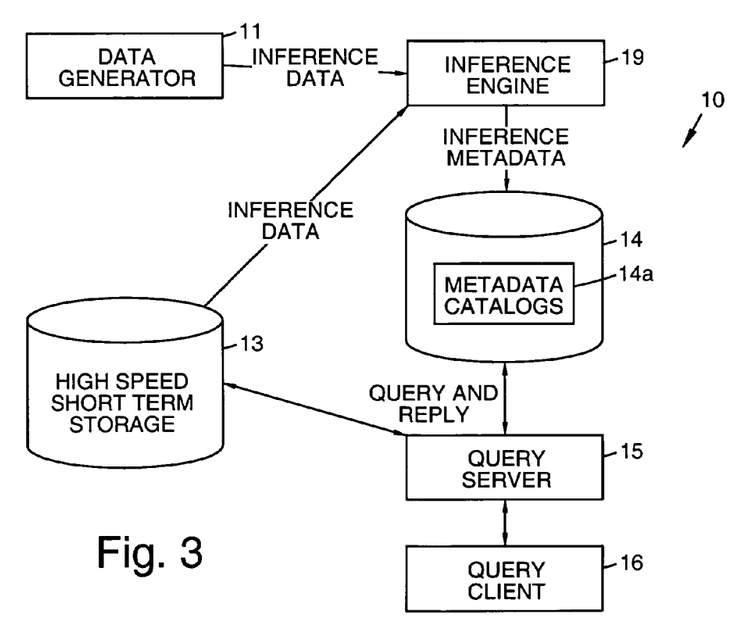
FIG. 3 illustrates the exemplary system configured to correlate inference data.

FIG. 3 illustrates components of the exemplary ingest, archival and retrieval system 10 that are used to correlate inference data. In this configuration, the data generator 11, inference engine 19, one or more high speed short term storage devices 13, database 14, query server 15 and query client 16 are involved in the data processing. Once the data has been pre-processed by the pre-archive filter 12 and stored in the short term storage devices 13, the inference engine 19 can find relationships between the data. This is a time-intensive process, but because the data is already stored in the one or more high speed short term storage devices 13, it can be accessed by the query server 15 while inference engine processing is under way.

Figure 4:
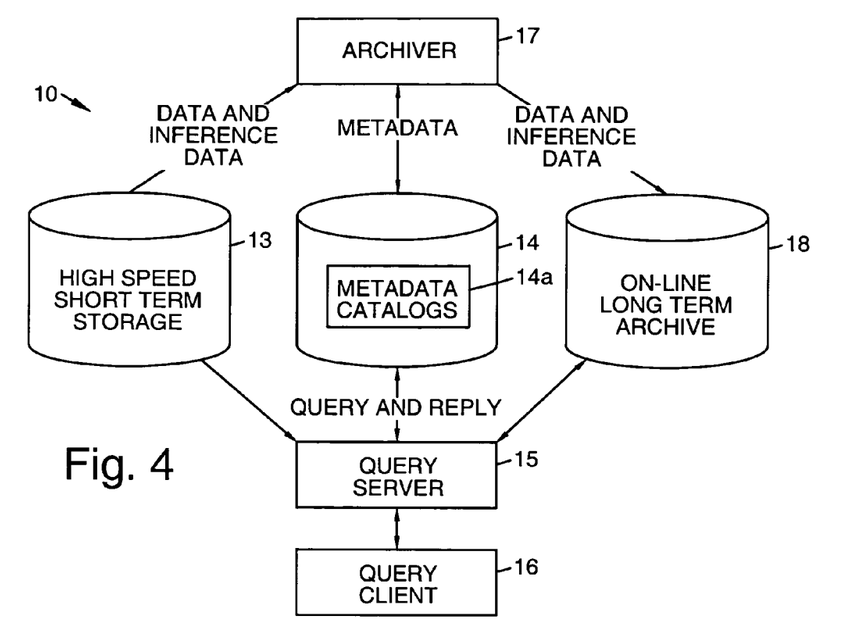
FIG. 4 illustrates the exemplary configured to archive data and inferences.

FIG. 4 illustrates components of the exemplary ingest, archival and retrieval system 10 that are used to archive data and inferences. In this configuration, the one or more high speed short term storage devices 13, database 14, archiver 17, on-line long term content-addressable archive 18, query server 15 and query client 16 are involved in the data processing. Once the inference process performed by the inference engine 19 is finished, the data is ready to be archived. The metadata catalog 14a in the database 14 is updated to reference the archived data instead of the copy of the data in the short term storage devices 13.

Figure 5:
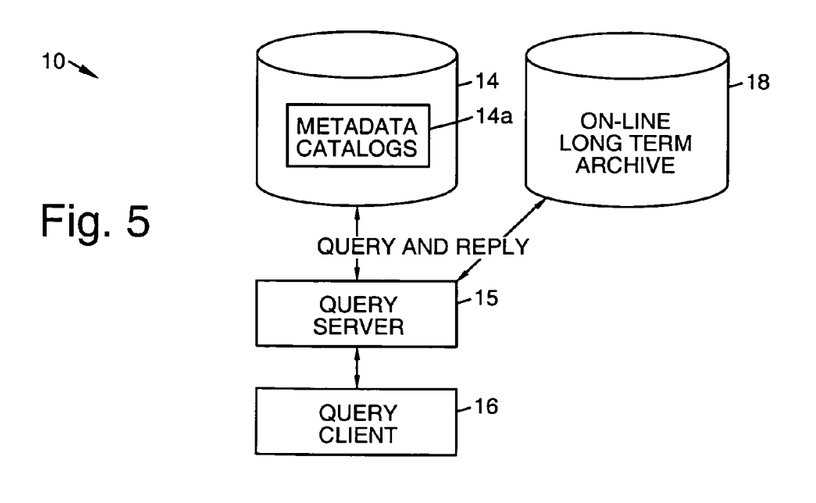
FIG. 5 illustrates the exemplary configured in a fully archived state.

FIG. 5 illustrates components of the exemplary ingest, archival and retrieval system 10 that are used when the system 10 is configured in a fully archived state. In this configuration, the database 14, on-line long term content-addressable archive 18, query server 15 and query client 16 are involved in the data processing. Once the archive process is complete, the data can be deleted from the high speed short term storage devices 13. However, the metadata continues to be stored outside of the archive 18 in the metadata catalog 14a in the database 14, thus allowing faster queries.

In general, the exemplary ingest, archival and retrieval system 10 allows data to be ingested very rapidly, much faster than conventional database architectures, and the data is placed in a queryable state almost immediately. From that point on, the data is always in a queryable state throughout the rest of the data's lifecycle. Archiving of data can thus be delayed until all changes to the data are completed, and then archiving of the data from the short-term storage device 13 to the long-term on-line content-addressable archive 18 is done in a transparent manner that does not affect user queries or drilldowns on the data. The ingest, archival and retrieval system 10 comprises a storage technology architecture and processing that create a data lifecycle that is always accessible without regard to physical location of the data on different storage elements.

The data is ingested, partitioned on key queryable fields, and stored as flat-files on high speed disks comprising the high speed short term storage devices 13. Catalog entries for each file are created in the database 14, rendering the files queryable. Each file has a maximum number of records, and when that limit is reached, the file is closed and the metadata catalog 14a stored in the database 14 is updated with additional metadata. A new file is opened with the next record that has matching key fields. While the files fill up, they can be queried by users by way of the query client 16 and the query server 15 using the metadata catalog 14a.

Once files are complete they can be copied to the on-line content-addressable archive 18. When archiving is complete, the location of the data is updated in the metadata catalog 14a and all future query drilldowns reference the archived data. When no already running queries are accessing the archived flat files, they can be deleted from the short-term storage device 13. Since the set of data is moved from flat files in the short-term storage device 13 to the on-line archive 18 as a unit, location transparency is maintained. User drilldowns will work the same against data in the flat files in the short-term storage device 13 or the archive 18; the location of the data is abstracted from the users.

Ingested data is partitioned into multiple files each with a single combination of the key fields. A matching database row containing matching key fields, ranges of data (such as time), and a logical pointer to the data file are co-created with the file and updated when the file is closed. The file name is generated from a combination of the logical file identifier and file type. New metadata containing a logical file pointer and an identifier for each record is created to provide a return address for high value inference relationships derived from intermediate inference data.

User queries against the metadata produce a result set of file identifiers that may be used to access data in the files. When queried, these data files return data in the same format that archived data is returned to facilitate transparent queries. The file data is filtered on the original query criteria and returned to the user.

It is possible to delay archiving until a complex set of operations have been completed against the ingested data. For example, correlations on the data can generate additional data and both the original data and the correlations are archived together once the correlations are complete. While the correlations are occurring, the results can be accessed by user drilldowns from query results. Once they are complete, users drilldowns are unaffected by the relocation of data to the archive 18.

Using a combination of database metadata catalogs 14a and software functions to drilldown or modify the data, identical query and update functionality can be implemented on the ingested files in the short term storage devices 13 and on-line archive 18 to provide complete location transparency of the data.

In summary, this approach provides for very fast ingest of data and renders the data queryable almost immediately. Once ingested the data is always in a queryable state and a seamless collection of data across the short term storage devices 13 and long term archive 18 is always maintained. Archived data, scalable to petabytes, is always available on-line through user queries and drilldowns.

Various aspects of the system 10 are discussed in detail below.

In the system 10, the data is queryable after it is initially processed by the pre-archive filter 12. Once the pre-archive filter 12 partitions the data, creates the metadata catalog 14a that is stored in the database 14, and the data is partitioned and stored in the one or more high speed short term storage devices 13, the data is thereafter in a persistent queryable state. Thus, there is no period of time that the data is unavailable for querying by a user. Integration of the data is seamless (either in short term or on-line long term storage) and users thus have a seamless view of the data. The data may always be queried, even though the data may be moved to the long term archive 18.

The metadata catalog 14a, short term storage devices 13, and on-line long term content-addressable archive 18 preserve the queryable nature of the data stored in the system 10. The system 10 is thus a hybrid one, using the metadata catalog 14a in conjunction with the files stored in the one or more high speed short term storage devices 13 at the beginning of the archive process. Whereas at the end of the archive process, the system 10 stores the information in the metadata catalog 14a and the on-line long term content addressable storage 18. The system 10 is operable to ingest data at a rate on the order of one-half million rows of data per second. The high speed of ingest is achieved because only the minimal amount of processing that still produces meaningful summary information to store in the metadata catalog 14a is being done to make the data queryable.

Software code for the data generator 11, archiver 17, query server 15 and query client 16 was developed using automated code generation (a code generation factory 30), discussed with reference to FIG. 6, to build integrated components at a low cost.

The inference engine 19 is used to create the short term storage files along with the metadata catalog 14a. The inference engine 19 allows information regarding pairs of attributes (three pairs, for example) to be correlated. Thus, the inference engine 19 provides for correlation of n dimensions of information, producing a metadata catalog 14a that allows queries of data in both the short term storage devices 13 and long term content-addressable archive 18. The inference engine 19 comprises a software module that is used as part of the ingest process, and is a parallel processing platform that operates in parallel with the pre-archive filter 12. A reduced-to-practice embodiment of the inference engine 19 is capable of performing 250,000 correlation per second, and allows from two to four degrees of correlation.

Additional details regarding the system 10 are discussed below.

Generation of Data.

Figure 6:
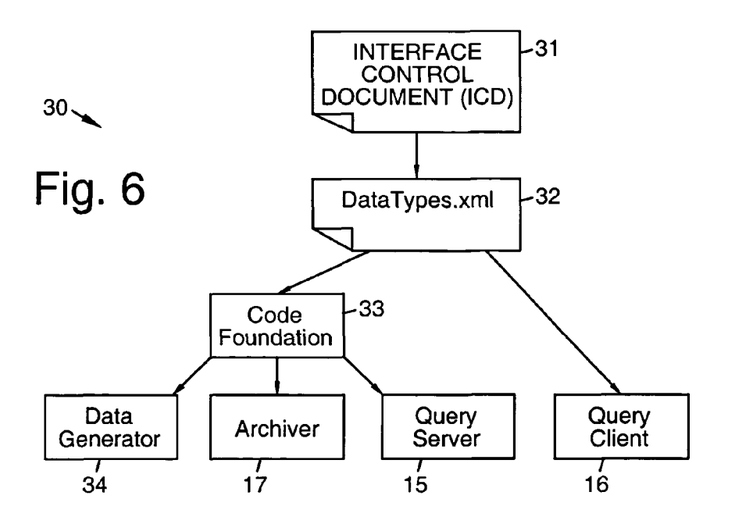
FIG. 6 illustrates exemplary coordinated code generation across multiple modules of the system.

FIG. 6 illustrates exemplary coordinated code generation across multiple modules of the system 10. More particularly, FIG. 6 illustrates an exemplary code generation factory 30 that is used to create software code comprising a high speed data generator 11 that is used in multiple components of the system 10.

The exemplary code generation factory 30 processes data derived from an interface control document (ICD) 31. The interface control document 31 defines the format of the data (i.e., data types) flowing through the system 10. Once all data types are defined in the interface control document 31, the code generation factory 30 automatically generates a DataTypes.xml file 32.

The DataTypes.xml file 32 is used to drive generation of the source code for the data generator 11, archiver 17 and query server 15 using code foundation data 33. The DataTypes.xml file 32 also drives rendering and processing of software code comprising the query client 16. The code generation factory 30 thus produces software code with differing functionality that shares consistent data structures and methods, for use in the data generator 11, archiver 17, query server 15, and query client 16.

The code generation factory 30 automates development of the software code that supports well-defined structured data records. The code generation factory 30 takes two types of files as input. The first type of input is provided by the DataTypes.xml file 32 and comprises an extensible markup language (XML) representation of simple high rate data structures and complex hierarchical data structures. The second type of input is provided by the code foundation data 33 and comprises a series of template files containing segments of source code mixed with special keywords (tokens). For each simple high rate data/complex hierarchical data structure defined in the XML file, the code generation factory 30 assembles the template files and replaces the tokens with text, numbers, or complete algorithms. The end result is complete source code comprising the high speed data generator 11, archiver 17 and query server 15 that support all data structures described in the original XML file.

Depending upon the number of data structures that are needed, the creation of the original XML file may take a few hours, while the code generation process completes in a matter of minutes. The alternative of hand-coding the complete source code could take weeks or even months to complete. The code generation process may be extended to produce source code to process the generated data, automating the development of a complete software system. Lastly, the code generation factory 30 may be written using a portable coding language. As a result, minimal effort is required to port the code generation factory 30 to different operating systems and hardware platforms.

Rapid Transformation of Data to a Persistent Queryable State.

A hybrid of metadata instantiated as database tables (catalogs 14a) in the database 14 and data instantiated as files in the short term storage devices 13 permits very fast transformations of data to a persistent queryable state. The data is first partitioned on values of several key fields in the pre-archive filter 12 to create multiple files each with a single combination of the key fields. A matching database row containing matching key fields, ranges of data (such as time), and a logical pointer to the data file is co-created with the file and updated when the file is closed. A file name is generated from a combination of the logical file identifier and file type. New metadata containing the logical file pointer and an identifier for each record is created to provide a return address for high value inference relationships derived from intermediate inference data.

User queries via the query client 16 against the metadata produce a result set of file identifiers that can be used to access data in the files stored in either the short term storage devices 13 or the long term content-addressable archive 18. These data files hold data in the same format that archived data is stored to facilitate transparent queries. The file data is filtered on the original query criteria and returned to the user.

Multi-Dimensional Inference Engine.

The inference engine 19 may be a general, scalable processor that could run in parallel with the pre-archive filter 12 on multiple servers, for example, and which performs n degrees of correlation using $2n-1$ processes to correlate multiple dimensions of one-to-one or one-to-many inference metadata to produce inference relationships.

The inference relationships are transformed to a persistent queryable state once they have been produced by the inference engine 19. They are also instantiated as data files with the same logical file identifier (but with a different file name based on their data type) and record identifiers as the original files, with the additional inference relationship attributes added. Once placed in a persistent queryable state, the inference relationships can be joined with data from a matching file using the file identifier and record identifiers to connect the high value inference relationship with the data record.

Figure 7:
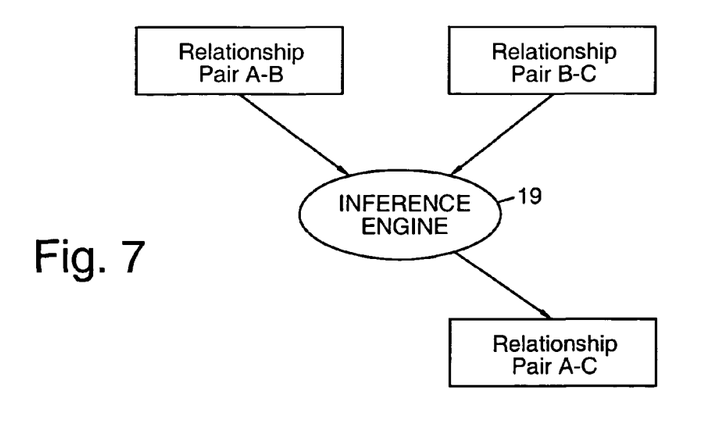
FIG. 7 illustrates correlation of two pairs of data.

The inference engine 19 correlates pairs of data to produce a new relationship-pair. FIG. 7 illustrates correlation of two pairs of data, wherein two pairs of data are correlated to produce a third pair. More particularly, relationship-pair A-B and relationship-pair B-C are processed by the inference engine 19 to correlate the two relationship-pairs and produce relationship-pair A-C.

Figure 8:
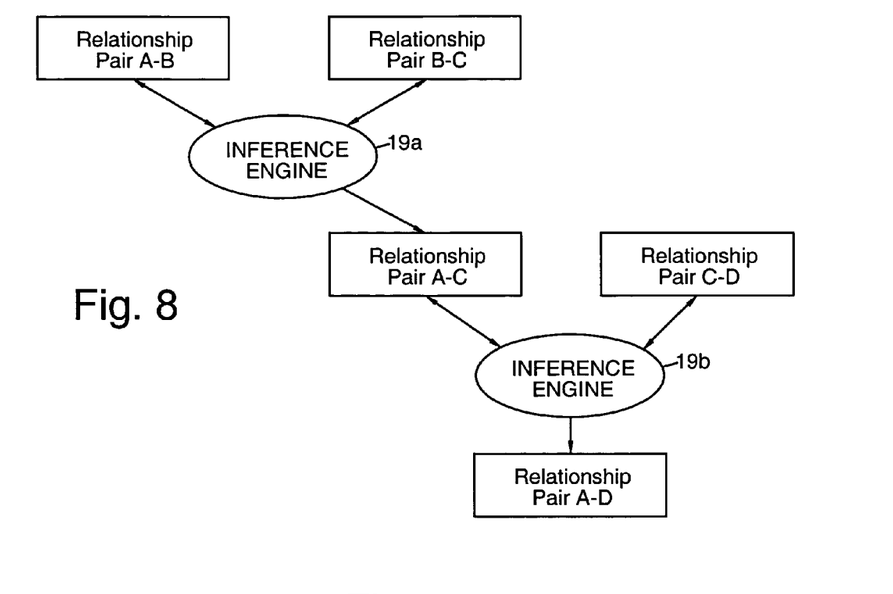
FIG. 8 illustrates correlation of three pairs of data.

FIG. 8 shows three pairs of data that are correlated by two inference engines 19a, 19b to produce a new relationship-pair. Each inference engine 19a, 19b has two inputs and a single output, and the inference engines 19a, 19b can be linked so that output from the first inference engine 19a is input to the second inference engine 19b.

Figure 9:
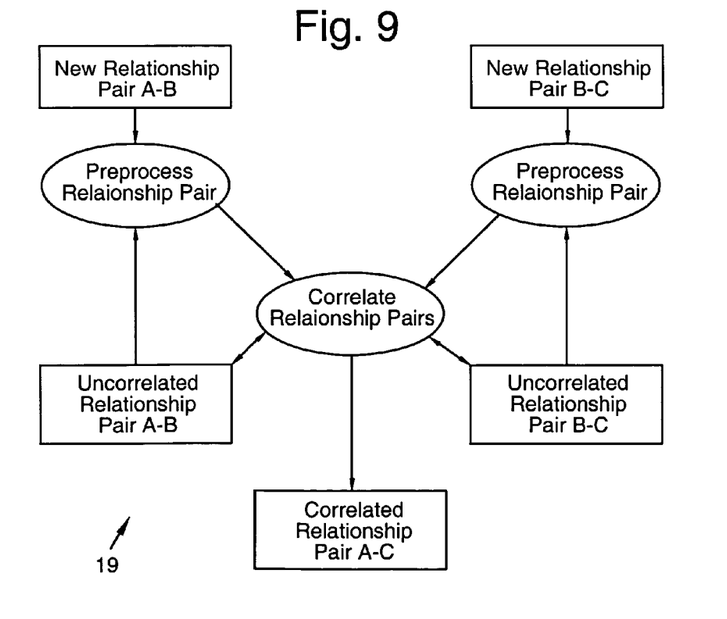
FIG. 9 illustrates inference engine processes and data stores.

FIG. 9 shows a high-level internal structure of an exemplary inference engine 19. Relationship-pairs are preprocessed and correlated producing a new relationship-pair. Preprocessing includes sorting the new data, merging it with uncorrelated data from a previous correlation, and removing expired data. Correlation merges the two pairs of inputs, generating correlated output pairs and uncorrelated relationship-pairs that are reprocessed. Relationship-pairs that do not correlate may be reprocessed until a correlation is found or an expiration rule (number of iterations or elapsed time) takes effect.

Although the functionality of the inference engine 19 is easily duplicated by a relational database, the inference engine 19 offers greater performance and scalability than a database. The inference engine 19 does not have the database overhead required to insert rows for correlation and remove rows that have correlated. The inference engine 19 can be instantiated as multiple processes running on multiple servers, with each process correlating its own distinct set of data. Sorting can be minimized for new data entering the inference engine 19, and when multiple inference engines 19 are linked together, sorting can be minimized with respect to the inputs of each inference engine 19. Uncorrelated data, can be kept in sorted order and merged with the newly sorted data before each correlation attempt.

Archiving of Data.

The archive process implemented by the archiver 17 may be used for different types of data. There are two main categories of data: inference data and stand-alone data. Stand-alone data archiving deals with two data sub-types, complex hierarchical data atructures data and flat large scale data. Archiving of the inference data involves the inference relationships derived from the inference engine 19 and the file created by transforming the data into a persistent queryable state. The stand-alone complex hierarchical data structure data is routed from the pre-archive filter 12 by way of the short term storage devices 13 and archived. The archiver 17 processes the stand-alone flat large scale data and takes the large scale data and breaks it into manageable pieces as part of the archive process.

The stand-alone data archive process archives simple high rate data records with an associated complex hierarchical data structure identifier and stores the information in industry standard content addressable storage comprising the content addressable long term archive 18. Each complex hierarchical data structure identifier includes an XML header followed by a write-once, read-many binary large object (BLOB). There are many simple high rate data records for each complex hierarchical data structure record and a majority of those simple high rate data records are associated with a complex hierarchical data structure record. The XML tag structure of the header is used to store information regarding which complex hierarchical data structure record the simple high rate data records are associated with, and where those simple high rate data records are located within the BLOB. The BLOB store all of the simple high rate data records sorted by associated complex hierarchical data structure record to minimize the number of complex hierarchical data structure information tags and facilitate query speed. With the information that is stored in the XML header it is possible to return only the simple high rate data records that are associated with a specific complex hierarchical data structure record. The simple high rate data records and their association information is read in from the queryable files produced by the inference engine 19 and moved into the content addressable long term archive 18 as soon as the complete association information is available for the files. The transition from files to the content addressable long term archive 18 is completely transparent to users querying the data.

The complex hierarchical data structure archive process handles large numbers of complex hierarchical data structure records and puts them in the content addressable storage archive 18. The XML tag structure uses a tree structure to preserve hierarchies of the subtypes within complex hierarchical data structure records. The fields within the complex hierarchical data structure records are written in BLOB format to minimize the total size and complexity of the XML header. The complex hierarchical data structure records are archived using a parallel infrastructure to parallelize the process. The archived data is made queryable by inserting rows of metadata about the complex hierarchical data structure records in the metadata catalog 14a.

The flat large scale data comprises flat large scale data objects that are generally too large to be archived at acceptable rates using a sequential process. To archive the flat large scale data quickly, the object is divided up into many smaller portions (chunks) which enter the content-addressable archive 18 as BLOBs. Since multiple processes may simultaneously access the long term archive 18, the chunks may be stored in parallel rather than sequentially. This parallelism results in significantly higher data storage rates. The content addresses for the archive chunks that are returned from the content addressable storage archive 18 are retained, and after all chunks have been archived, are stored in a master list in the content addressable long term archive 18, along with any metadata associated with the flat large scale object. The catalog entry referencing the flat large scale object only stores the content address of the master list along with other relevant metadata.

Dynamic Queries of Complex Hierarchical Data Structures.

Presented below are details regarding processes used to achieve an extensible client-side query for complex hierarchical data structure records, while maintaining optimal performance for the query. There are two primary components that provide for this flexibility and speed.

The first component is the DataTypes.xml file that is also used to create complex hierarchical data structure records, and identifies the data types and hierarchical structure of the complex hierarchical data structure records. This provides an extensible method for identifying all queryable fields and user interface components associated with those fields. In addition, priorities can be set in the XML file which allows ordering of the searchable fields for better usability. Once XML tags and values are parsed, object-oriented design patterns may be used to optimize creation of all search criteria fields in a graphical user interface (GUI).

The second component involves formulating a dynamic query string which is passed from the graphical user interface to the server-side query component (query server 15). The query string is built from all selected fields in the graphical user interface as well as the node of the hierarchical structure that the user is currently viewing. In addition, a tree traversal algorithm is used to take advantage of the hierarchical structure of the complex hierarchical data structure record. This prevents time-consuming database join operations on all of the tables which can greatly increase performance when querying large amounts of data. The tree may be traversed three times in total, for example. The first traversal marks all selected leaf nodes (and parents of the leaf nodes) to indicate which nodes have changed. In the second traversal, a lowest level common parent is found using the marked nodes. In the last traversal, a query string is built starting from the common parent node found in the second traversal. This prevents retrieval of false positive records from the data set.

These components in the graphical user interface allow a user to navigate the hierarchy. Additionally as the user performs queries from different nodes of the hierarchy, the query is dynamically modified and executed to show the corresponding result set for that node in the hierarchy. The user can view both the result set and the current node to provide a complete context for the fragment of the hierarchy that is displayed.

Thus, a fast ingest, archive and retrieval system 10 has been disclosed. The hardware and software components of the system 10 are operative to ingest and generate data, derive additional information (inferences) relating to the data, archive the data, and dynamically query the data. These processes combine together to provide a complete system 10 for archiving data. The infrastructure for this system 10 includes an entire life cycle for multiple data types within a long-term archive 18. This allows for flexibility in the data types that are archived, and high-speed ingesting and archiving of the ingested data.

The ingest and archive system 10 includes software that was developed using automated code generation, and new code to support new complex data types may be automatically generated with a minimal cost and time investment. The ingest and archive system 10 generates high value inference data derived from a series of intermediate relationships. The ingest and archive system 10 archives very large amounts of data while retaining query functionality. The ingest and archive system 10 provide for a client application that builds, executes and displays results for dynamic queries run against hierarchical data structures.

Figure 10:
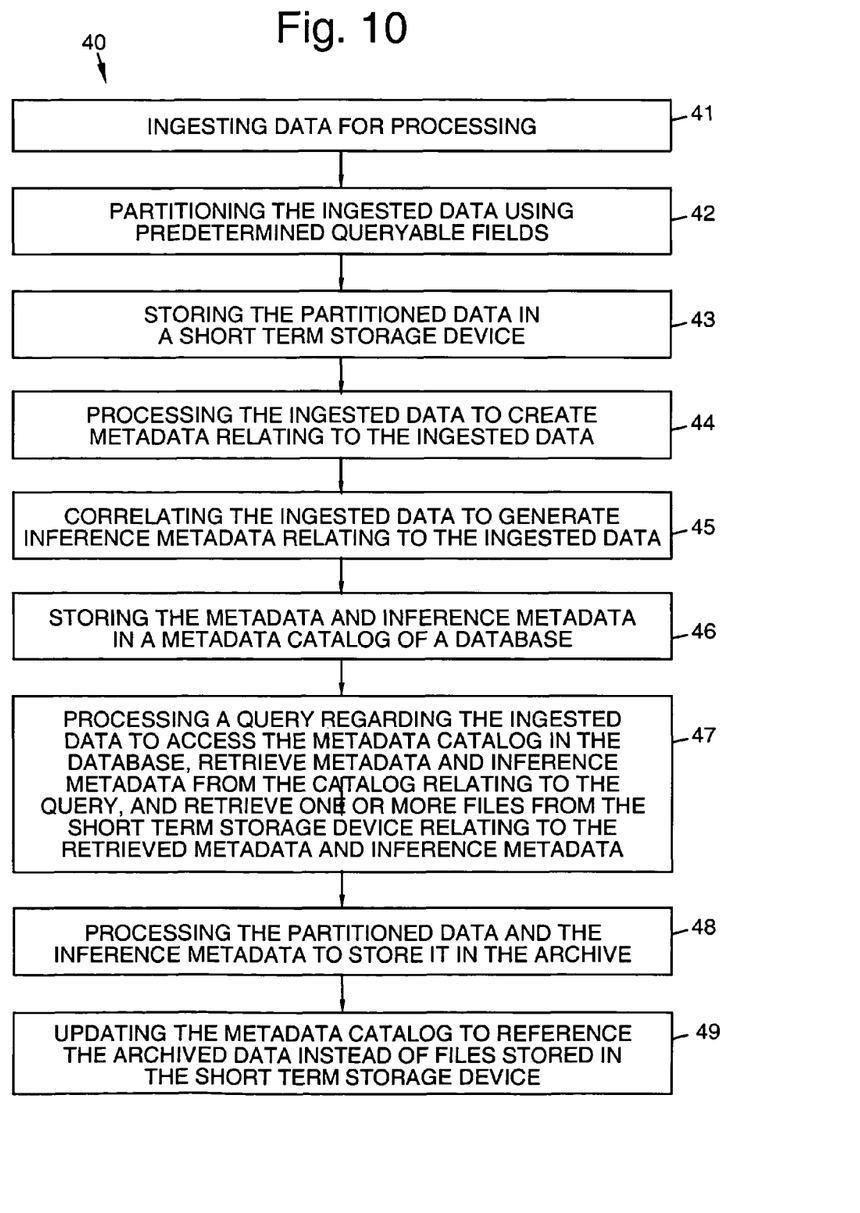
FIG. 10 illustrates an exemplary method of the ingest, archival and retrieval system.

FIG. 10 is a flow diagram illustrating and exemplary method 40 that may be implemented using the above-described concepts. The exemplary method 40 is representative of a computer program that may be embodied on a computer-readable medium, and that may be instantiated using the above-described concepts. The exemplary method 40 is implemented as follows.

Data is ingested 41 for processing. The ingested data is partitioned 42 using predetermined queryable fields. The partitioned data is stored 43 in a short term storage device 13. The ingested data is processed 44 to create metadata relating to the ingested data. The ingested data is correlated 45 to generate inference metadata relating to the ingested data. The metadata and inference metadata is stored 46 in a metadata catalog 14*a* of a database 14. A query regarding the ingested data (i.e., the partitioned data files stored in the short term storage device 13) is processed 47 to access the metadata catalog 14*a* in the database 14, retrieve metadata and inference metadata from the catalog 14*a* relating to the query, and retrieve one or more files from the short term storage device 13 relating to the retrieved metadata and inference metadata. The exemplary method 40 may also process 48 the partitioned data and the inference metadata to store it in the archive 18, and update 49 the metadata catalog 14*a* to reference the archived data instead of files stored in the short term storage device 13.

Thus, an improved ingest, archival and retrieval systems, processing methods and computer programs have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. An apparatus comprising:
    a data generator for generating data to be archived;
    a pre-archive filter for partitioning the data using predetermined queryable fields and for creating metadata relating to the data;
    a short term storage device for storing the partitioned data in partitioned data files only until archiving of the data from the short term storage device to a long term storage is completed;
    a database for storing the metadata in a metadata catalog, wherein the partitioned data files in conjunction with the metadata stored in the metadata catalog provides for persistent queryable files;
    a query client for entering a query regarding the partitioned data files;
    a query server for processing the query for querying against data stored in the short term storage device and the long term storage in the same way such that the data is always in a queryable state through the rest of the data's lifecycle from the partitioning, the long term storage configured to store data archived from the short term storage device;
    an archiver for processing the partitioned data files to store them in the long term storage and for updating the metadata catalog to reference the archived data files; and
    an inference engine for correlating a first data and a second data from the data to generate a first relationship pair, correlating the second data and a third data from the data to generate a second relationship pair, and correlating the first relationship pair and the second relationship pair to generate a third relationship pair correlating the first data and the third data, the inference engine operating in parallel with the pre-archive filter,
    wherein in the correlating, the inference engine performs n degrees of correlation to correlate multiple dimensions of one-to-one or one-to-many inference metadata to produce inference relationships,
    wherein the data is queryable by the query server during the correlating, and
    wherein queryable includes user based searching using keywords.

2. The apparatus recited in claim 1, the inference engine correlating the third relationship pair and a fourth relationship pair correlating the third data and a fourth data from the data to generate a fifth relationship pair correlating the first data and the fourth data.

3. The apparatus recited in claim 2 wherein the inference metadata are instantiated as data files having a logical file and record identifiers that are the same as the partitioned data files.

4. The apparatus recited in claim 1 wherein data derived from an interface control document that defines formats for data types and code foundation data are processed to automatically generate an extensible markup language (XML) file and generate source code having differing functionality that shares consistent data structures and methods using the XML file to instantiate the data generator, archiver, query server, and query client.

5. The apparatus recited in claim 4 wherein the XML file comprises an XML representation of simple high rate data structures and complex hierarchical data structures, and wherein the code foundation data comprise template files containing segments of source code mixed with tokens.

6. A data processing method comprising:
    ingesting data for archiving;
    partitioning by a pre-archive filter the ingested data using predetermined queryable fields;
    storing the partitioned data in a short term storage device only until archiving of the data from the short term storage device to a long term storage is completed;
    processing the ingested data to create metadata relating to the ingested data;

storing the metadata in a metadata catalog of a database;
processing a query for querying against data stored in the short term storage device and the long term storage in the same way such that the data is always in a queryable state through the rest of the data's lifecycle from the partitioning;
processing the partitioned data to store it in the long term storage;
updating the metadata catalog to reference the archived data; and
correlating by an inference engine a first data and a second data from the data to generate a first relationship pair, correlating the second data and a third data from the data to generate a second relationship pair, and correlating the first relationship pair and the second relationship pair to generate a third relationship pair correlating the first data and the third data, the inference engine operating in parallel with the pre-archive filter,
wherein in the correlating, n degrees of correlation are used to correlate multiple dimensions of one-to-one or one-to-many inference metadata to produce inference relationships,
wherein the data is queryable during the correlating, and
wherein queryable includes user based searching using keywords.

7. The method recited in claim 6, wherein correlating by the inference engine includes correlating the third relationship pair and a fourth relationship pair correlating the third data and a fourth data from the data to generate a fifth relationship pair correlating the first data and the fourth data.

8. The method recited in claim 6 wherein data derived from an interface control document that defines formats for data types and code foundation data are processed to automatically generate an extensible markup language (XML) file and generate source code having differing functionality that shares consistent data structures and methods using the XML file.

9. The method recited in claim 8 wherein the XML file comprises an XML representation of simple high rate data structures and complex hierarchical data structures, and wherein the code foundation data comprise template files containing segments of source code mixed with tokens.

10. The method recited in claim 9 wherein, for each structure defined in the XML file, a template file is assembled and the tokens are replaced with text, numbers, or complete algorithms to generate the source code that supports all data structures described in the XML file.

11. The method recited in claim 6 wherein the inference relationships are transformed to a persistent queryable state and are instantiated as a data file with a same logical file identifier and different file name based on their data type and record identifiers as an original file, along with additional inference relationship attributes.

12. The method recited in claim 6 wherein once the inference relationships are transformed to a persistent queryable state, they can be joined with data from a matching file using a file identifier and record identifiers to connect the inference relationship with a data record.

13. The method recited in claim 6 wherein the inference engine preprocesses relationship-pairs, sorts the relationship-pairs, merges the relationship-pairs with uncorrelated relationship-pairs from a previous correlation, removes expired relationship-pairs, and correlates relationship-pairs to produce a correlated relationship-pair.

14. A non-transitory computer-readable medium comprising:
a first code segment for ingesting data for archiving;
a second code segment for partitioning the ingested data using predetermined queryable fields;
a third code segment for storing the partitioned data in a short term storage device only until archiving of the data from the short term storage device to a long term storage is completed;
a fourth code segment for processing the ingested data to create metadata relating to the ingested data;
a fifth code segment for processing a query for querying against data stored in the short term storage device and the long term storage in the same way such that the data is always in a queryable state through the rest of the data's lifecycle from the partitioning;
a sixth code segment for storing data archived from the short term storage device to the long term storage;
a seventh code segment for updating a metadata catalog to reference the archived data; and
an eighth code segment for correlating a first data and a second data from the data to generate a first relationship pair, correlating the second data and a third data from the data to generate a second relationship pair, and correlating the first relationship pair and the second relationship pair to generate a third relationship pair correlating the first data and the third data, the eighth code segment operating in parallel with the second code segment,
wherein in the correlating, n degrees of correlation are used to correlate multiple dimensions of one-to-one or one-to-many inference metadata to produce inference relationships,
wherein the data is queryable during the correlating, and
wherein queryable includes user based searching using keywords.

15. The non-transitory computer-readable medium according to claim 14 further comprising:
a ninth code segment for storing the inference metadata in the metadata catalog; and
a tenth code segment for storing the inference metadata in an archive,
wherein the eighth code segment for correlating further includes a code segment for correlating the third relationship pair and a fourth relationship pair correlating the third data and a fourth data from the data to generate a fifth relationship pair correlating the first data and the fourth data.

16. A non-transitory computer-readable medium for generating code, comprising:
a first code segment for processing data derived from an interface control document that defines formats for data types and code foundation data to automatically generate an extensible markup language (XML) file and generate source code having differing functionality that shares consistent data structures and methods using the XML file;
a second code segment for partitioning the processed data using predetermined queryable fields;
a third code segment for storing partitioned data in a short term storage device only until archiving of the data from the short term storage device to a long term storage is completed;
a fourth code segment for processing a query for querying against data stored in the short term storage device and the long term storage in the same way such that the data is always in a queryable state through the rest of the data's lifecycle from the partitioning;
a fifth code segment for storing data archived from the short term storage device to the long term storage; and a sixth code segment for correlating a first data and a second data from the data to generate a first relationship pair, correlating the second data and a third data from the data to generate a second relationship pair, and correlating the first relationship pair and the second relationship pair to generate a third relationship pair correlating the first data and the third data, the sixth code segment operating in parallel with the second code segment, wherein in the correlating, n degrees of correlation are used to correlate multiple dimensions of one-to-one or one-to-many inference metadata to produce inference relationships, wherein the data is queryable during the correlating, and wherein queryable includes user based searching using keywords.

17. The non-transitory computer-readable medium according to claim 16 wherein the XML file comprises an XML representation of simple high rate data structures and complex hierarchical data structures, and wherein the code foundation data comprise template files containing segments of source code mixed with tokens.

18. The non-transitory computer-readable medium according to claim 17 wherein, for each structure defined in the XML file, a template file is assembled and the tokens are replaced with text, numbers, or complete algorithms to generate the source code that supports all data structures described in the XML file.

19. The apparatus recited in claim 2 wherein the inference metadata are instantiated as data files having:

the same logical file identifier as the partitioned data files, but with a different file name based upon a data type, and the same record identifiers as the partitioned data files.

20. The apparatus recited in claim 1 wherein the first relationship pair, the second relationship pair, and the third relationship pair are metadata relationships.

* * * * *